No. 789,275. PATENTED MAY 9, 1905.
S. A. HARRIS.
CULTIVATOR DISK.
APPLICATION FILED NOV. 4, 1904.
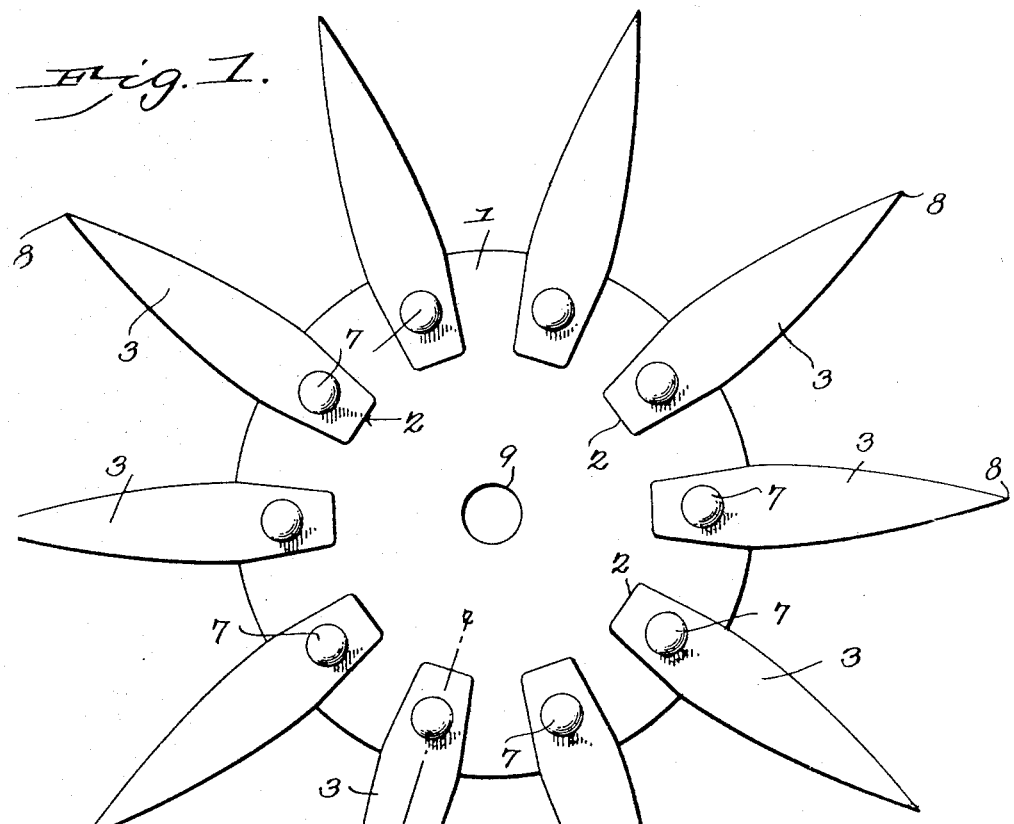
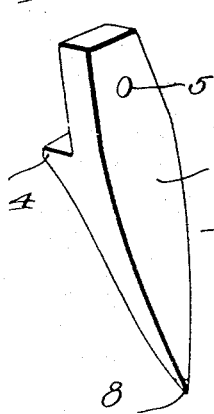
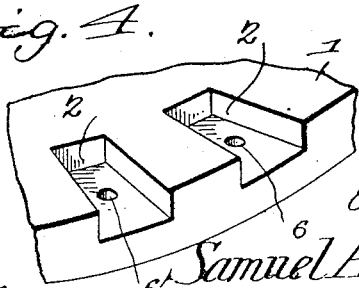
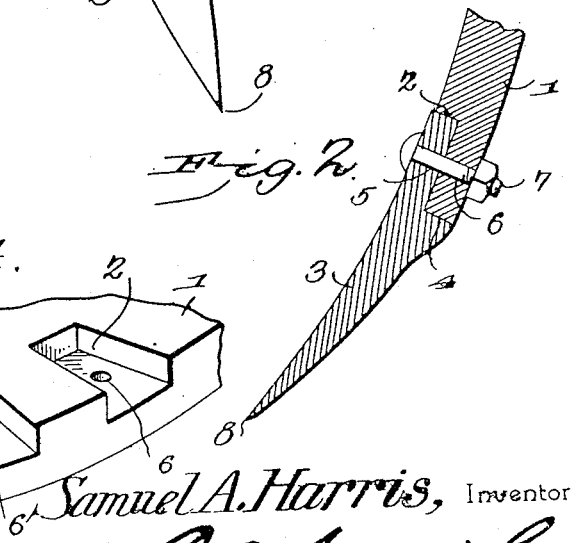
Witnesses
Samuel A. Harris, Inventor
by C. A. Snow & Co.
Attorneys No. 789,275. Patented May 9, 1905.

UNITED STATES PATENT OFFICE.

SAMUEL A. HARRIS, OF CHAMBERSVILLE, TEXAS.

CULTIVATOR-DISK.

SPECIFICATION forming part of Letters Patent No. 789,275, dated May 9, 1905.

Application filed November 4, 1904. Serial No. 231,408.

*To all whom it may concern:*

Be it known that I, SAMUEL A. HARRIS, a citizen of the United States, residing at Chambersville, in the county of Collin and State of Texas, have invented a new and useful Cultivator-Disk, of which the following is a specification.

This invention relates to cultivator-disks for stirring and agitating the soil.

In the cultivation of various crops, and notably in the cultivation of alfalfa, it is extremely desirable that the surface of the soil be broken and disintegrated and that this breaking and disintegration be accomplished to as great a depth as possible, thereby admitting air, light, and moisture, and yet without overturning or otherwise disturbing the strata of the soil and without injuriously cutting or disturbing the roots of the plants.

The present invention has for its object to provide a cultivating-disk whereby this operation may be performed in a thorough and effective manner; and with this end in view the invention consists in the improved construction of said disk which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that changes, alterations, and modifications may be made within the scope of the invention and without departing from the spirit or sacrificing the efficiency of the same.

In said drawings, Figure 1 is a side elevation of a cultivator-disk constructed in accordance with the principles of the invention. Fig. 2 is a sectional detail view taken on the line 2 2 in Fig. 1. Fig. 3 is a perspective view showing one of the teeth detached from the disk. Fig. 4 is a perspective detail view showing a portion of the disk.

Corresponding parts in the several figures are indicated by like characters of reference.

1 designates a concavo-convex disk of suitable dimensions, which is provided on its concaved side adjacent to the rim or edge with a plurality of recesses 2 2, which are spaced equidistantly apart, affording seats for the teeth 3 3. The latter are provided with shoulders 4, adapted to abut upon the periphery of the disk, and said teeth and disk are provided with registering perforations 5 6 for the reception of bolts 7, whereby the teeth are firmly connected with the disk. The teeth 3, which are curved on an arc coincident with the curve of the disk, are of tapering shape and are provided at their extremities with sharp points 8, which will readily penetrate into the soil.

In operation a plurality of the disks, each of which may be provided with any desired number of teeth, are mounted for rotation in any suitable manner and are connected with a frame which is propelled over the ground by any suitable agency. The teeth of the disks will penetrate the soil to a considerable depth and will break, loosen, and disintegrate the same without operating injuriously upon the roots of the plants which it is desired to preserve, but freely admitting air and moisture. This operation is mainly due to the fact that the teeth 3 of the device are curved, as hereinbefore described, on an arc coincident with the curvature of the disk. By this construction the teeth will readily penetrate into the soil, and the latter will be stirred and loosened to a considerable depth without the least tendency to a spading action on the part of the teeth whereby the roots of the plants would be cut. The particular object of the device, as hereinbefore set forth, is simply to stir and to loosen the soil. While this might be accomplished to a certain extent by the use of a spading-disk, it is equally true that the use of such an implement would inevitably cut the roots of the plants and cause the mischief which by the use of my improved device is avoided.

The device, as will be seen, is extremely simple in construction, and the teeth of the same may be readily detached for the purpose of sharpening or for replacing in the event of breakage. The said teeth will be held with the utmost security in the recesses provided for their reception, and the shoulders 4, abutting upon the periphery of the disk, will greatly reinforce the construction.

The disk has been shown as being provided with a central eye or perforation 9, whereby it may be readily mounted for rotation.

Having thus described the invention, what is claimed is—

1. A concavo-convex cultivating-disk provided with curved teeth extending from the periphery thereof and gradually beveled to sharp earth-engaging points; the curvature of said teeth being approximately coincident with the curvature of the disk.

2. A concavo-convex cultivating-disk provided with teeth extending from the periphery thereof, said teeth being curved on an arc coincident with the curve of the disk.

3. A concavo-convex cultivating-disk provided with beveled sharp-pointed teeth extending from the periphery thereof, said teeth being curved on an arc coincident with the curve of the disk.

4. A concavo-convex cultivating-disk provided with earth-engaging members curved on an arc coincident with the curvature of the disk.

5. A concavo-convex cultivating-disk provided with sharp-pointed earth-engaging members curved on an arc coincident with the curvature of the disk, said earth-engaging members being detachably connected with said disk.

In testimony that I claim the foregoing as my own I have hereto affixed my signature in the presence of two witnesses.

SAMUEL A. HARRIS.

Witnesses:
W. A. HOUSER,
J. E. McLEMORE.